United States Patent [19]

Raith

[11] Patent Number: 4,708,467
[45] Date of Patent: Nov. 24, 1987

[54] CAMERA

[75] Inventor: Siegfried K. Raith, North Lake, Australia

[73] Assignee: Cameronics Technology Corporation, Ltd., Bayswater, Australia

[21] Appl. No.: 942,014

[22] Filed: Dec. 12, 1986

Related U.S. Application Data

[62] Division of Ser. No. 777,925, Sep. 19, 1985, abandoned.

[30] Foreign Application Priority Data

Sep. 21, 1984 [AU] Australia .............................. PG7246

[51] Int. Cl.⁴ .............................................. G03B 27/42
[52] U.S. Cl. ........................................ 355/53; 355/87
[58] Field of Search ................ 355/53, 54, 73, 86, 355/87, 95

[56] References Cited

U.S. PATENT DOCUMENTS

| | | | |
|---|---|---|---|
| 3,146,664 | 9/1964 | Freeman | 355/40 |
| 3,639,059 | 2/1972 | Strumor et al. | 355/53 X |
| 3,704,655 | 12/1972 | Frylund et al. | 354/15 |
| 3,810,694 | 5/1974 | Harrell et al. | 355/53 X |
| 3,877,799 | 4/1975 | O'Donnell | 355/40 |
| 3,987,467 | 10/1976 | Cowles | 355/40 X |
| 4,084,903 | 4/1978 | Pircher | 355/53 |
| 4,541,714 | 9/1985 | Miyamoto | 355/53 X |
| 4,588,288 | 5/1986 | Nakasugi et al. | 355/53 |
| 4,648,708 | 3/1987 | Kosugi | 355/53 |

Primary Examiner—Richard A. Wintercorn
Attorney, Agent, or Firm—Fidelman & Wolffe

[57] ABSTRACT

In one aspect of the present invention there is provided a camera for producing microfiche images, comprising a loading station, an exposure station, an unloading station spaced from the loading and exposure stations, vacuum means for taking a sheet of film to be exposed from the loading station, transporting the sheet of film to the exposure station for exposure to one or more images thereat, and transporting the exposed film sheet to the unloading station, and for transporting film sheets to other stations as may be required, said vacuum means being in the form of a vacuum platen mounted on an X-Y movement system comprising a first screw shaft operatively connected to the vacuum platen, a second screw shaft also operatively connected to the vacuum platen and extending at right angles to the first screw shaft, each of said screw shafts being connected to a respective stepper motor, each stepper motor being arranged to rotate its screw shaft.

In other aspects the invention also relates to a microfiche camera comprising a titling device, a device for raising film sheet cassettes, a valve member or a focussing arrangement.

7 Claims, 13 Drawing Figures

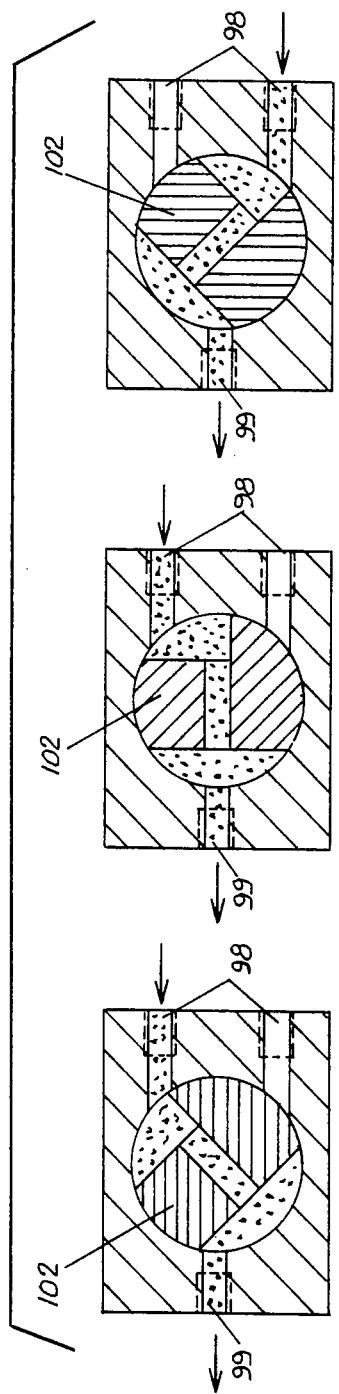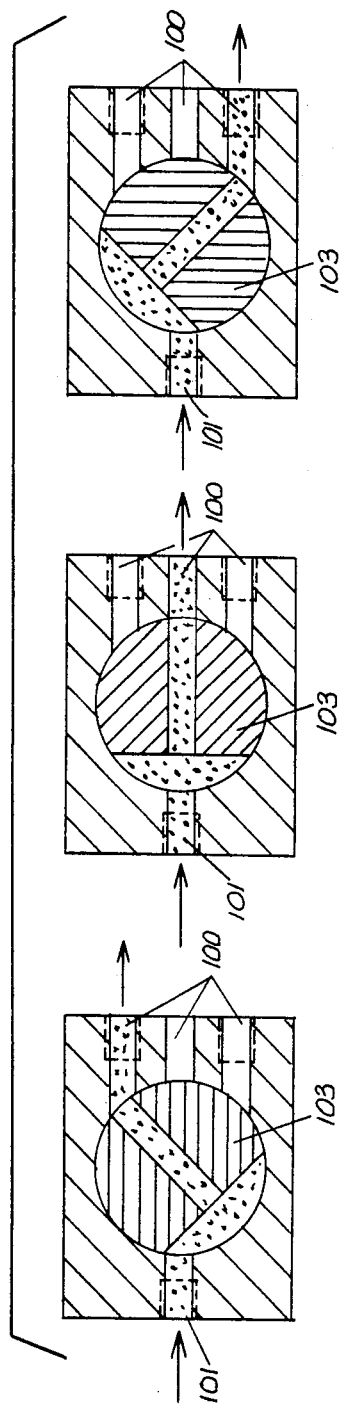
FIG. 4A.
FIG. 4B.

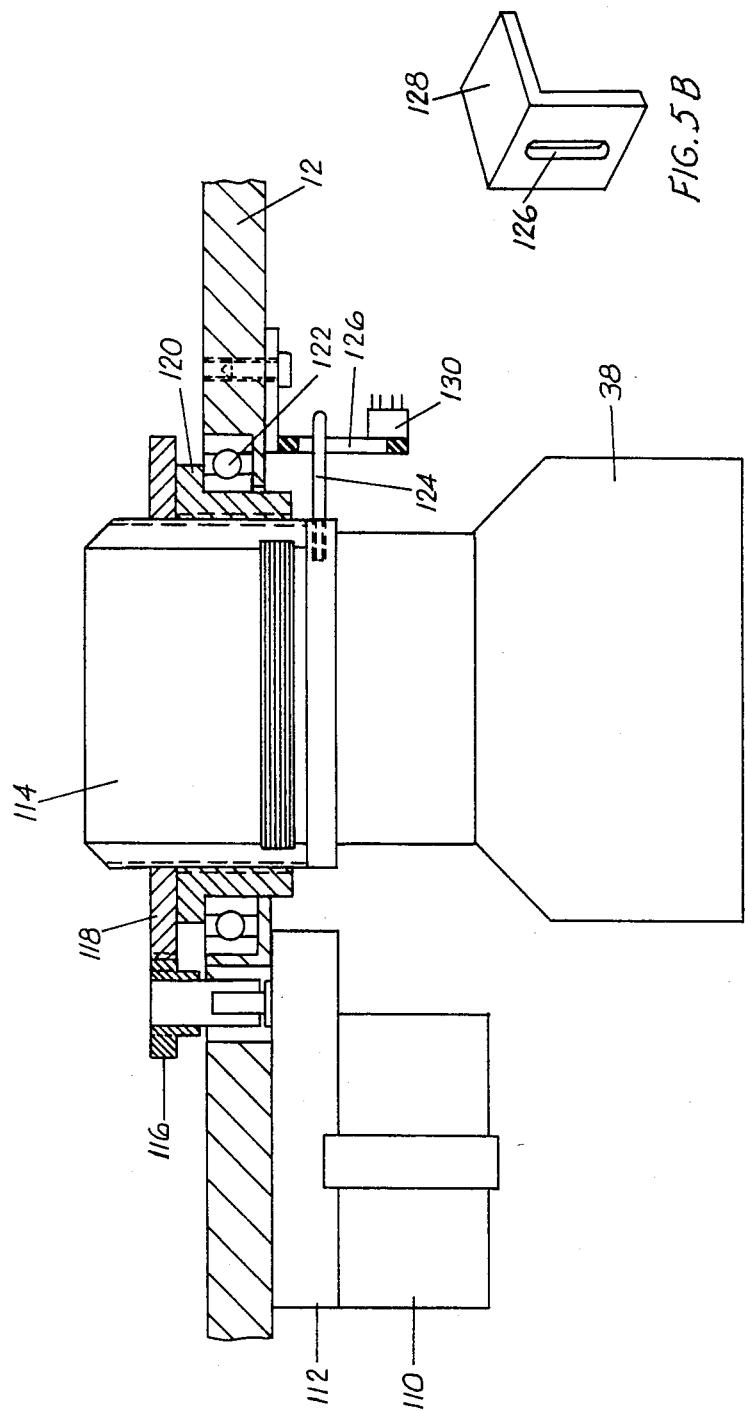

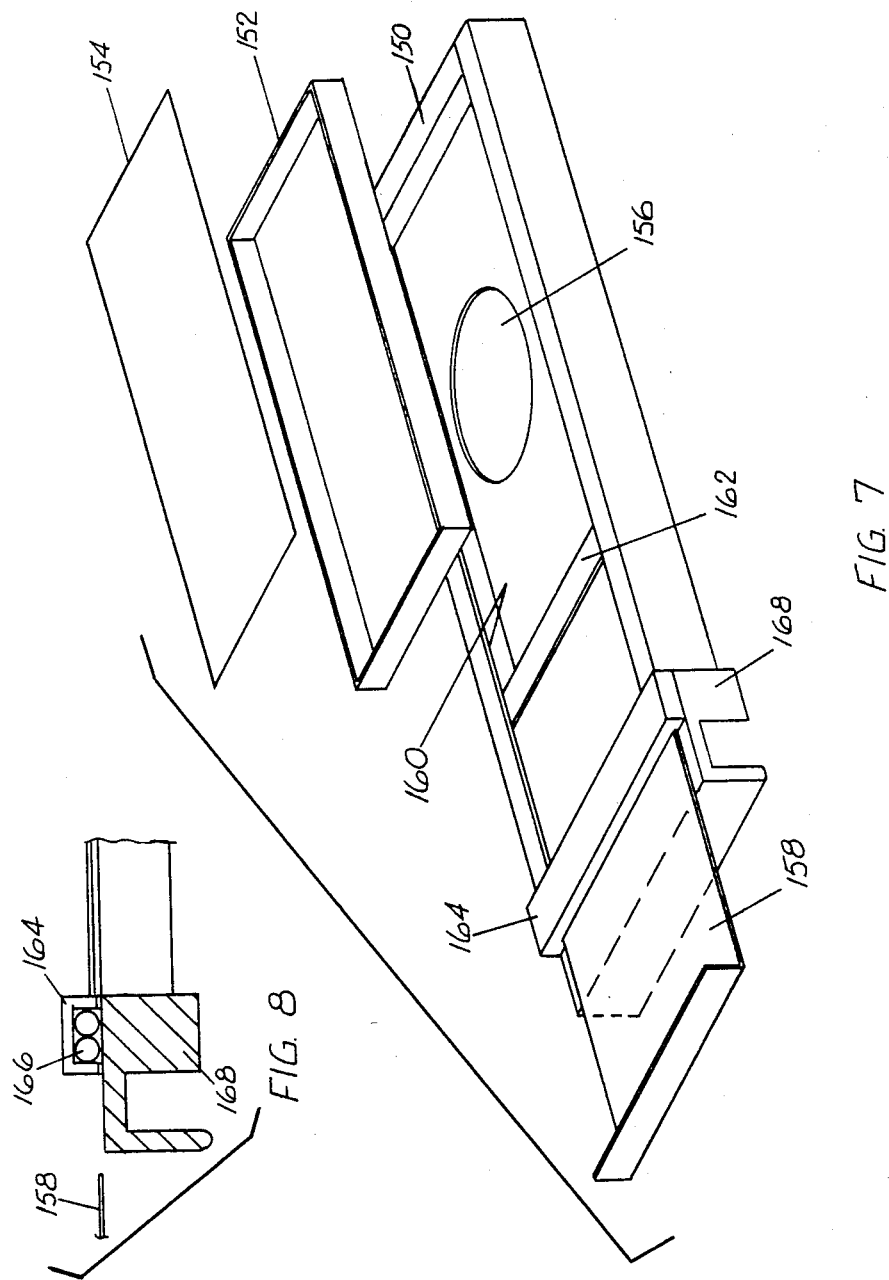

CAMERA

This application is a division, of application Ser. No. 777,925, filed Sept. 19, 1985 now abandoned.

The present invention relates to a camera for providing microfiche images.

In accordance with a first aspect of the present invention there is provided a camera for providing microfiche images having a titling device comprising a disk marked with eyeball readable indicia, a stepper motor connected to the disk for rotatably moving the disk in a step-wise manner, a light source arranged to expose a film sheet in the titling device to the eyeball readable indicia, and means for moving the film sheet through the titling device in step wise manner, such that selected portions of the film sheet can be exposed to selected eyeball readable indicia so as to record a title on the film sheet.

In accordance with a second aspect of the present invention there is provided a camera for providing microfiche images, comprising a piston located in a pneumatic cylinder and arranged for reciprocable motion between a first retracted position and a second extended position, a first end of the cylinder being closed off by an end plate, a second end of the cylinder being open, a compressed gas inlet adjacent the second end of the cylinder such that the piston can be caused to move towards its second position up on compressed for being fed through the compressed gas inlet, a cassette holder arranged to be located adjacent the pneumatic cylinder, a base in the cassette holder, an aperture in the base so that when the piston is in its second extended position a film sheet cassette may be raised from the cassette holder to enable a film sheet to be removed from or placed into the cassette by means of a vacuum platen.

In accordance with a third aspect of the present invention there is provided a camera for producing microfiche images containing a valve member comprising a stepper motor, a ported housing, a coupling connecting the stepper motor with the interior of the housing, the housing having at least one first inlet port and a corresponding single first outlet port, a group of three second outlet ports and a corresponding single second inlet port, wherein the first outlet port is connected to a vacuum side of an airpump, a first inlet port is connected to a vacuum platen for holding film sheets, the second inlet port is connected to the air supply side of an air pump, two of the second outlet ports are connected to respective pneumatic cylinders associated with a cassette holder and arranged to raise some for removal or receipt of a film sheet, whilst the remaining second outlet port leads to the atmosphere, means being provided in the housing for selectively interconnecting the inlet ports with their corresponding outlet ports.

In accordance with a fourth aspect of the present invention there is provided a camera for producing microfiche images, having a lens comprising a focussing arrangement comprising a motor operatively connected to the lens, the lens having an externally threaded portion mounted in an aperture, an arm projecting from the lens, a sensing means located adjacent the lens, said sensing means cooperating with the arm to determine a particular position of the lens in the aperture from which other lens positions can be calculated.

In accordance with a fifth aspect of the present invention there is provided a camera for producing microfiche images, comprising a loading station, an exposure station, an unloading station spaced from the loading and exposure stations, vacuum means for taking a sheet of film to be exposed from the loading station, transporting the sheet of film to the exposure station for exposure to one or more images thereat, and transporting the exposed film sheet to the unloading station, and for transporting film sheets to other stations as may be required, said vacuum means being in the form of a vacuum platen mounted on an X-Y movement system comprising a first screw shaft operatively connected to the vacuum platen, a second screw shaft also operatively connected to the vacuum platen and extending at right angles to the first screw shaft, each of said screw shafts being connected to a respective stepper motor, each stepper motor being arranged to rotate its screw shaft.

The present invention will now be described by way of example with reference to the accompanying drawings, in which:

FIGS. 4A & 4B show various sectional views through the valve of FIG. 3 depicting various operational configurations thereof;

FIG. 5A is a vertical section through a lens mounting used in the camera of FIG. 1;

FIG. 5B is a perspective view of the bracket shown in FIG. 5A.

FIG. 7 is an upper perspective view of a cassette holder assembly used in the camera of FIG. 1; and FIG. 8 is a sectional view through part of the cassette holder of FIG. 7 showing a light seal.

Figure 1:
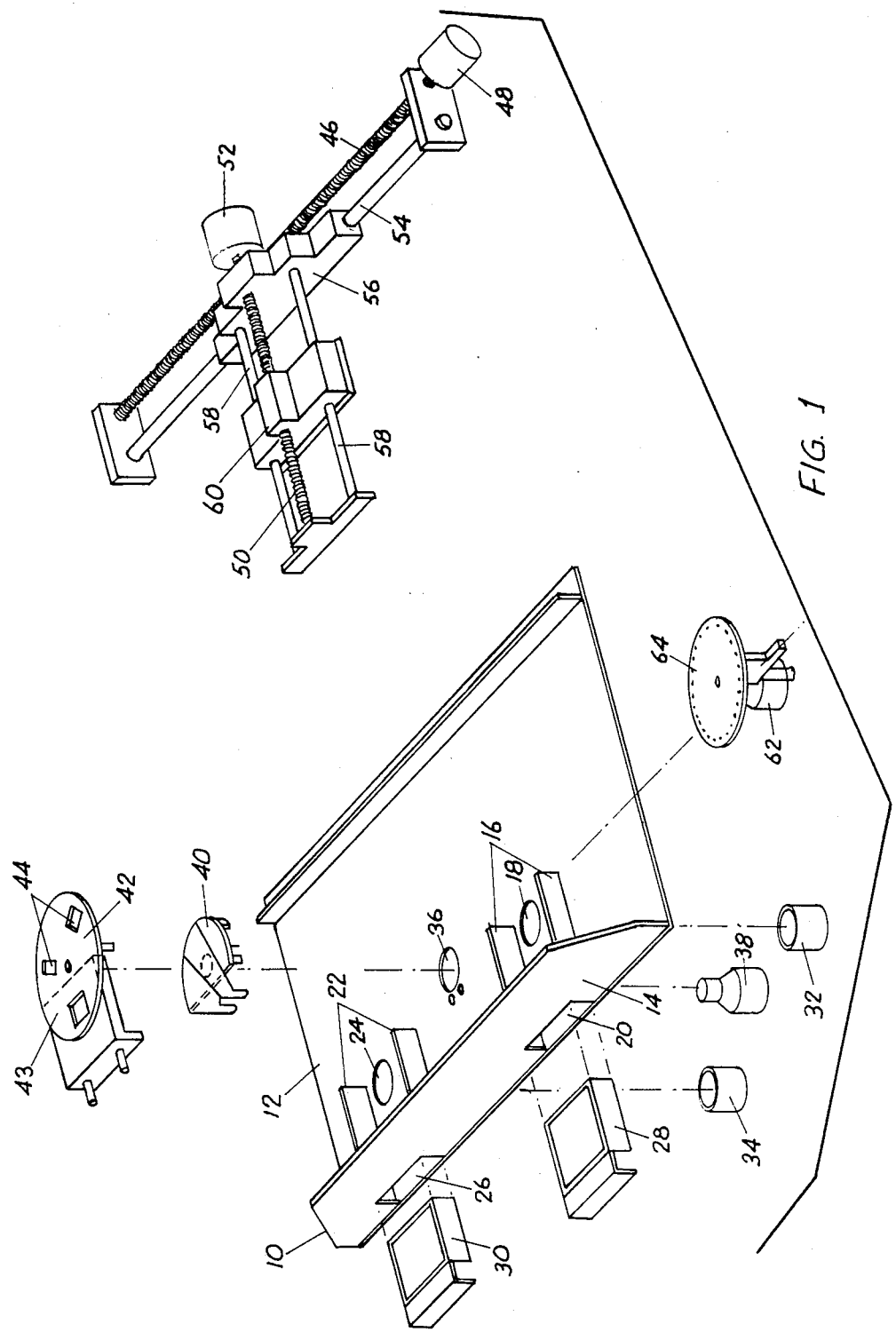
FIG. 1 is a schematic, exploded view of a camera in accordance with the present invention.

In FIG. 1, there is shown a camera 10 comprising a base plate 12 and a backing plate 14.

The base plate 12 has mounted thereon a first pair of spaced, parallel, upright guide plates 16 which are located on opposite sides of a circular aperture 18 in the base plate 12. The guideplates 16 are also located adjacent respective outer sides of a rectangular aperture 20 in the backing plate 14. The base plate 12 has mounted thereon a second pair of spaced, parallel, upright guide plates 22 which are located on either side of a further circular aperture 24 in the base plate 12. The guide plates 22 are also located adjacent respective outer sides of a rectangular aperture 26 in the backing plate 14. The aperture 20 and its corresponding guide plates 16 form a loading station and are arranged to receive a loading cassette holder 28 which, in use, contains unexposed film for exposure. The aperture 26 and its corresponding guide plates 22 form an unloading station and are arranged to receive an unloading cassette holder 30 which, in use, contains film which has been exposed. The aperture 18 is associated with a pneumatic cylinder 32 and the aperture 24 is associated with a pneumatic cylinder 34.

Further, the base plate 12 comprises an exposure station provided with an aperture 36 having mounted therein a lens 38. The exposure station also comprises a shutter 40 and a mask turret 42. The mask turret 42 comprises a rotatable plate 43 containing a number of rectangular apertures 44 of different size and/or shape for exposure of frames of different area or shape in a sheet of film. The camera 10 also comprises an apparatus for removing a sheet of film from the loading station, transporting it to the exposure station and then transporting it to the unloading station. This apparatus comprises a first screw shaft 46 which is attached to a stepper motor 48 and a second shaft 50 which is at right angles to the shaft 46 and is attached to a stepper motor 52. The stepper motors 48 and 52 rotate their screw shafts 46 and 50 respectively in use.

A smooth shaft 54 runs parallel to the shaft 46 and has mounted on it a carriage 56. The carriage 56 is also operatively engaged with the screw shaft 46 by the screw shaft 46 passing through an internally threaded aperture in the housing 56, so that as the latter is rotated the carriage 56 moves horizontally along the shaft 54. A further pair of smooth shafts 58 run parallel to the shaft 50. A vacuum platen 60 is mounted on the shafts 58. The vacuum platen 60 is operatively connected to the screw shaft 50, the screw shaft 50 passing through an internally threaded aperture in the vacuum platen 60 so that as the latter is rotated the vacuum platen 60 moves horizontally along the shafts 58. Thus, in use, the carriage 56 is caused to move along the shaft 54 by rotation of the shaft 46 caused by operation of the stepper motor 48. Further, the vacuum platen 60 is caused to move along the shafts 58 by rotation of the shaft 50 caused by operation of the stepper motor 52. In this way, the vacuum platen can be moved to any desired location over the base plate 12.

The camera 10 also comprises a titling device 62 which is located on the base plate 12 at an appropriate location and comprises a titling wheel 64 having eyeball readable indicia about its periphery.

In use, a loaded cassette holder 28 containing a number of sheets of film is fed through the aperture 20 between the guide plates 16 to lie over the aperture 18. Similarly, an empty cassette 30 is fed through the aperture 26 to lie between the guide plates 22 over the aperture 24.

Figure 2A:
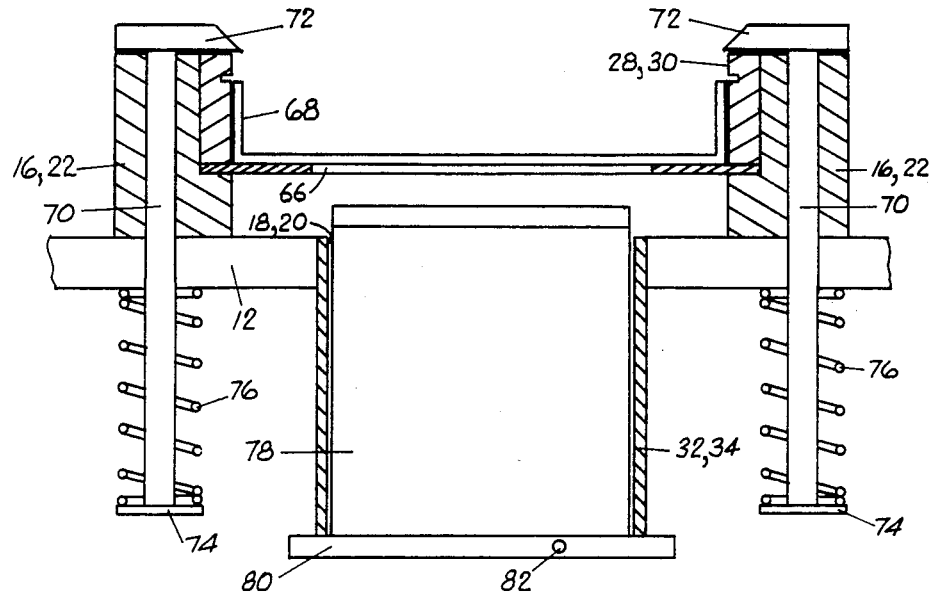
FIG. 2A is a vertical section through a pneumatic cylinder used in the camera of FIG. 1, with the pneumatic cylinder in a non-operative position.
Figure 2B:
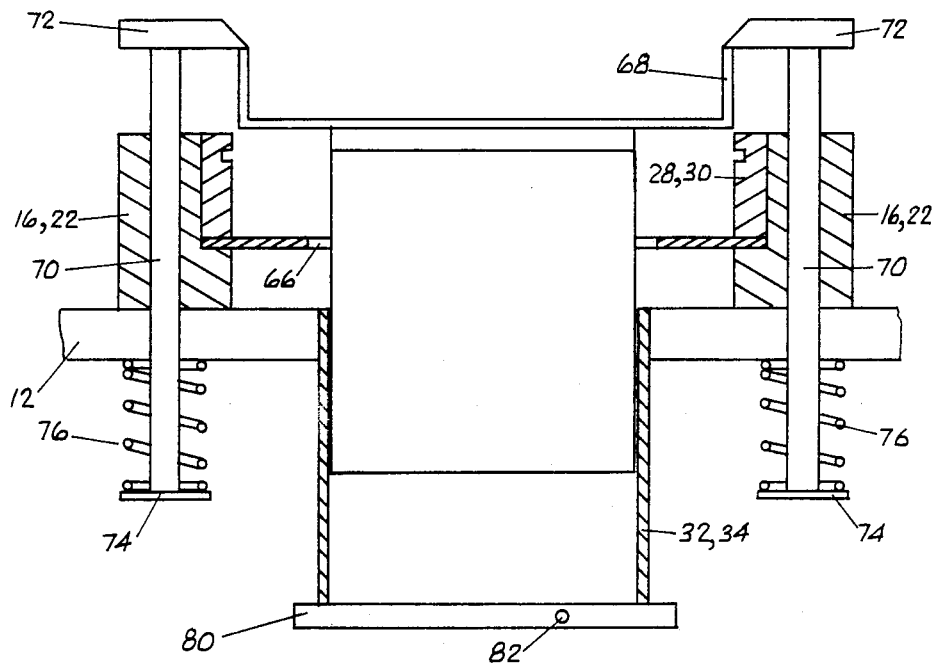
FIG. 2B is a view similar to FIG. 2A with the pneumatic cylinder in an operative position.

In FIGS. 2A and 2B there is shown a cassette holder 28 or 30 associated with a novel pneumatic mechanism and the construction and operation of the pneumatic mechanism holder 28 or 30 will now be described.

It will be seen that the cassette holder 28 or 30 comprises a base and peripheral walls about the base. The base is provided with an aperture 66. Further, the cassette holder 28 or 30 contains a cassette 68 which is of a size to receive snugly a stack of sheets of film.

It can be seen that the guide plates 16 or 22 have rods 70 extended downwardly through them. The rods 70 have caps 72 attached to their upper ends. The caps 72 project inwardly to overlie wall of the cassette 68. Further, the rods 70 extend downwardly through the base plate 12 and have stops 74 attached to their lower ends. A coil spring 76 is mounted about each rod 70 between the base plate 12 and the stop 74. The spring 76 urges the cap 72 downwardly and the cap 72 retains the cassette 68 in place between the guide plates 16.

Further, the pneumatic cylinder 32 or 34 is located in the aperture 18 or 20 in the base plate 12. A pneumatic piston 78 is located in the pneumatic cylinder 32 or 34.

Further, the pneumatic cylinder 32 or 34 is provided with a lower, end plate 80 provided with a compressed air inlet 82.

In use, as shown in FIG. 2B, the piston 78 is raised in the cylinder 32 or 34 by compressed air being fed through the inlet 82 into the cylinder 18. This raising of the piston 78 causes it to pass through the aperture 66 and push up the tray 68 against the caps 70.

In the raised position, the tray 68 is arranged to dispense a topmost sheet of film in the tray 68. This is achieved by moving the vacuum platen 60 over the tray 68 and applying suction to the topmost sheet of film to pull the sheet of film out of the tray 68.

The sheet of film attached to the vacuum platen 60 thus moves to the exposure station for exposure and subsequently to the unloading station. At the exposure station the sheet of film is exposed to a plurality of images through the lens 38. The size of each exposed area is determined by the mask turret 42 and the position of the plate 43. The shutter 40 is used to expose each area in known manner. The image to be reproduced is located below the lens 38 and is back lit. The shutter 40 exposes the sheet of film momentarily to each image. Then the vacuum platen 60 is used to move the sheet of film so that discrete areas thereof are exposed in turn to different images. Further, means is preferably provided for determining which areas have been exposed and which are still available for exposure.

At the unloading station the reverse procedure takes place in which the exposed sheet of film is released from the vacuum platen 60 by removing the suction therefrom and allowing it to fall into a cassette 68 of the cassette holder 30. At this point the cassette 30 is in a raised position as shown in FIG. 2B.

The cassette 30 is then lowered on a piston 78 by opening of the air inlet 82. A loaded cassette 30 can be removed for processing.

A novel type of valve 90 which is designed to be used for control of the piston 78 and the vacuum platen 60 is shown in FIGS. 3 and 4.

Figure 3A:
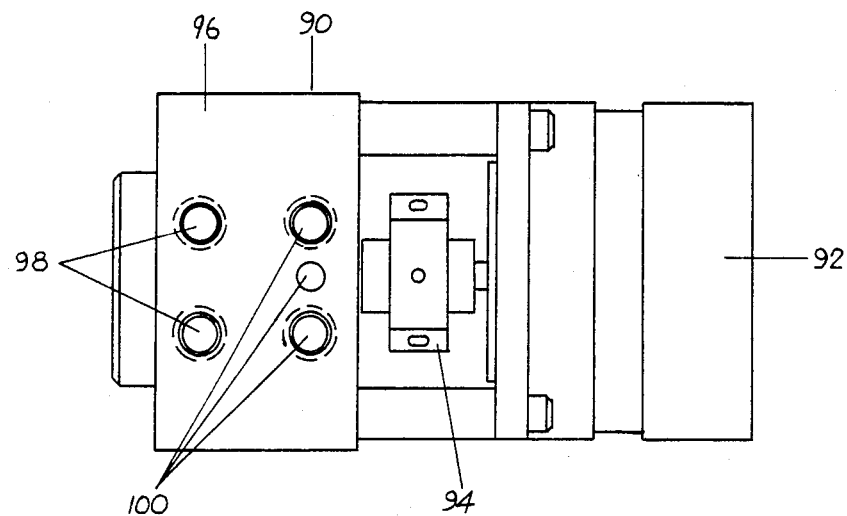
FIG. 3A is a schematic side elevation of a pneumatic valve used in the camera of FIG. 1.

As shown in FIG. 3A, the valve 90 comprises a stepper motor 92 connected via a flexible coupling 94 to the interior of a ported housing 96. The housing 96 has one pair of air inlet ports 98 and a single corresponding air outlet port 99.

The housing 96 also has a further group of three outlet ports 100 adjacent the ports 98, and a single corresponding air inlet port 101.

In FIG. 4A there is shown an arrangement of the pair of ports 98 and the corresponding single port 99. The single port 99 is connected to a vacuum side of an air pump (not shown) whilst the upper port of the pair is connected to the vacuum platen 60. The lower port of the pair is connected to a transfer turret which may be used to receive a microfiche already containing an image from the vacuum platen 60.

The vacuum platen moves away from the turret and an image containing microfiche on the turret is exposed to light so as to form a reproduction of the image to an enlarged scale on plain paper.

The ports 98 and the port 99 are arranged to be selectively interconnected by a rotatable valve member 102. In FIG. 4B there is shown an arrangement of the triple set of ports 100 and the corresponding single port 101. The single port 101 is connected to the air supply side of an air pump (not shown). The upper port of the triple set of ports 100 is connected to a cylinder 32 while the lower port of the triple set of ports 100 is connected to the cylinder 34. The intermediate port of the triple set of ports 100 leads to the atmosphere. The ports 100 and the port 101 are arranged to be selectively interconnected by a rotatable valve member 103. Each set of ports is associated with a respective rotatable valve member 102 and 103 located within the housing 96. The rotatable valve members 102 and 103 are coupled together and are arranged to be rotated together by the stepper motor 92 via the coupling 94.

Figure 3B:
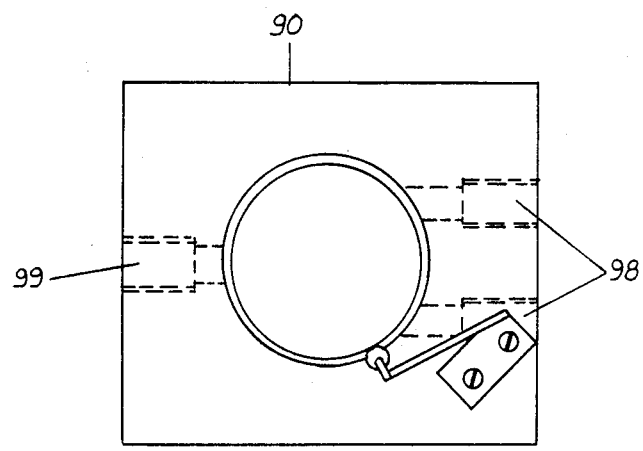
FIG. 3B is an end elevation of the valve of FIG. 3A.

In the first position of the valve 96 shown on the left in FIG. 4, the vacuum side of the air pump is connected to the vacuum platen 60 as shown in FIG. 4A. At the same time the pressure side of the air pump is connected to the cylinder 32 through the upper port 100. Thus, the piston 78 in the cylinder 32 is raised as shown in FIG. 3B and the vacuum platen 60 is applying suction to enable it to pick up a sheet of film to be exposed.

In the intermediate position shown in the middle of FIG. 4, the valve members 102 and 103 have been rotated through 45° such that the vacuum platen 60 is still connected to the vacuum side of the pump but the pressure side of the pump is connected to the middle port 100 so that air is vented to atmosphere. This position corresponds to the exposure phase of the camera of FIG. 1.

In the third position shown on the right in FIG. 4, the valve members 102 and 103 have been rotated a further 45°. In this position the vacuum side of the pump is connected, as shown in FIG. 4A, to a transfer turret. The pressure side of the pump is connected to the cylinder 34 to raise the piston 78 therein and enable an exposed film to be unloaded into the cassette 30.

In FIG. 5, there is shown a novel focussing arrangement for the lens 38.

As can be seen in FIG. 5 a motor 110 is mounted below a gear box 112 which is suspended from the base plate 12. The lens 38 has an upper externally threaded portion 114 which is threadedly engaged with a corresponding thread in the aperture 36. The motor 110 is connected via the gear box 112 to a small gear wheel 116 located above the base plate 12. The gear wheel 116 is in mesh with a large gear wheel 118. The gear wheel 118 is fixedly connected to an internally threaded annular member 120 which forms the aperture 36 and threadedly engaged with the portion 114 of the term 38. The annular member 120 is rotatably mounted in a roller bearing 122.

An arm 124 projects laterally of the lens 38 and engages with a vertical slot 126 in a bracket 128. A micro switch 130 is located adjacent the lower end of the slot 126.

In use, means is provided for setting the lens 38 to its lower position in which the arm 124 contacts the micro switch 130, prior to commencement of use. This establishes the position of the lens 38.

Then the focus is adjusted as may be required for different sized exposure frames and degrees of magnification by energising the motor 110 so as to rotate the gears 116 and 118 and the annular member 120 so as to cause the lens 38 to move vertically by a predetermined amount in the aperture 36.

Preferably, means is provided for measuring the movements of the lens 38 during exposure of different frames on a sheet of film so that the current focus position of the lens 38 is known.

Figure 6A:
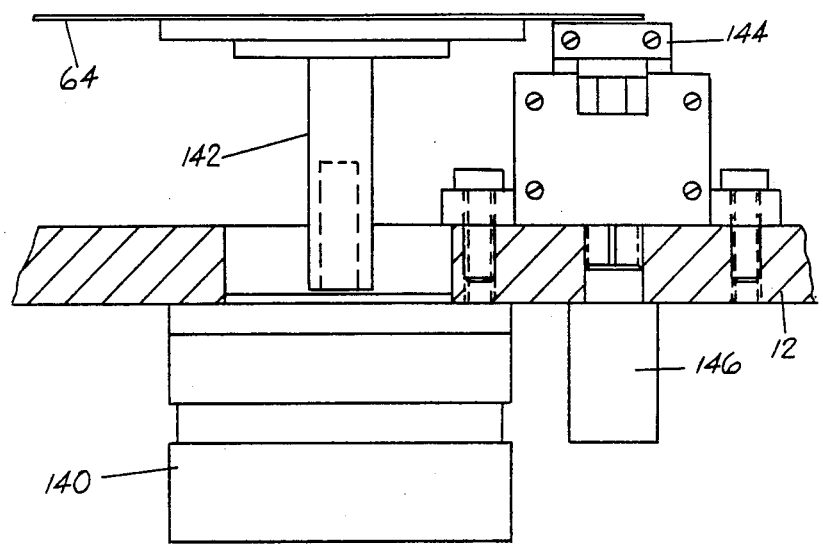
FIG. 6A is a horizontal sectional view of the titling device used in the camera of FIG. 1.
Figure 6B:
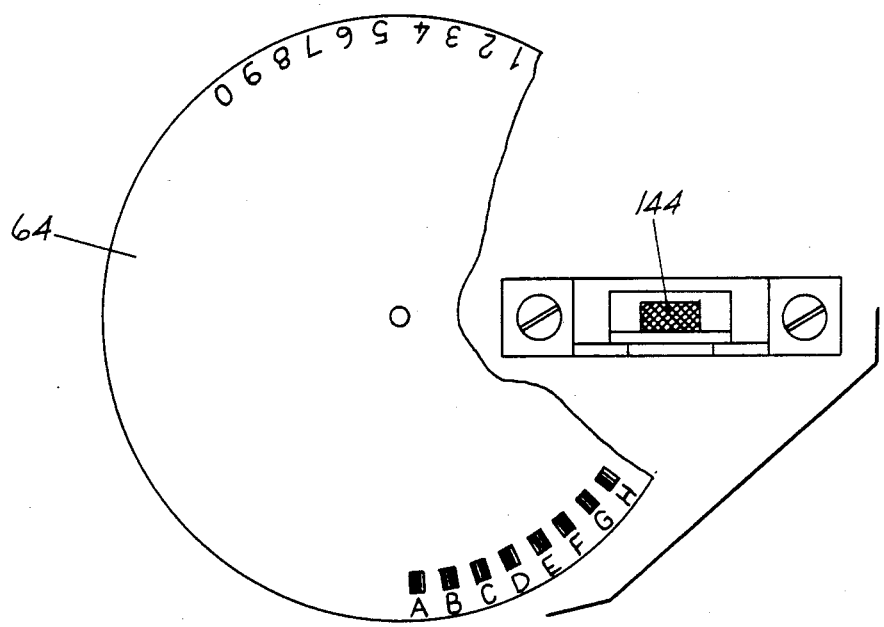
FIG. 6B is a vertical section through a titling device used in the camera of FIG. 1.

In FIG. 6, there is shown a preferred, novel construction of the titling device 62. The titling device 62 comprises a stepper motor 140 mounted below the base plate 12. The stepper motor 140 is connected through the base plate 12 by means of a shaft 142 to the disc 64.

An LED 144 is arranged to be selectively energised by a solenoid 146. The solenoid 146 is suspended from the base plate 12. The LED 144 is located immediately below the periphery of the disc 64.

In use, a film sheet to be exposed which has been picked up by the vacuum platen 60 from the cassette 28 is moved by suitable means so that a titling section of the sheet lies above the LED 144 and the periphery of the disc 64.

The eyeball readable indicia required in the title are selected in turn by stepwise rotation of the disc 64 by means of the stepper motor 140. Each selected indicia is exposed by the LED and the film sheet is moved stepwide through the titling station so as to expose the eyeball readable section of the sheet in stepwise manner to the required indicia. The film sheet is subsequently moved to the exposure station.

In FIGS. 7 and 8, there is shown in detail construction of film cassette holders 28 and 30. The cassette holder comprises a holder 150 arranged to receive a microfiche cassette 152 which snugly receives a stack of film sheets 154.

The holder 150 comprises an aperture 156 below the cassette 152. When a loaded cassette 152 has been inserted in the tray 150, the assembly can be made light tight by sliding a lid 158 into opposed lateral grooves 160 in the cassette holder 150.

The cassette holder 150 has a cross bar 162 arranged to hold the cassette 152 firmly in place.

The trailing end of the lid 158 is passed through a light seal 164 illustrated in FIG. 8, in which a raised housing contains a pair of resilient elongated seals 166.

The trailing end of the cassette holder 150 is formed with a handle portion 168 comprising an upper rearwardly extending flange integrally formed at its outer end with a downwardly extending flange.

Modifications and variations such as would be apparent to a skilled addressee are deemed within the scope of the present invention.

I claim:

1. A camera for providing microfiche images, comprising a piston located in a pneumatic cylinder and arranged for reciprocable motion between a first retracted position and a second extended position, a first end of the cylinder being closed off by an end plate, a second end of the cylinder being open, a compressed gas inlet adjacent the second end of the cylinder such that the piston can be caused to move towards its second position upon compressed gas being fed through the compressed gas inlet, a cassette holder arranged to be located adjacent the pneumatic cylinder, a base in the cassette holder, an aperture in the base so that when the piston is in it second extended position a film sheet cassette may be raised from the cassette holder to enable a film sheet to be removed from or placed into the cassette by means of a vacuum platen.

2. A camera as claimed in claim 1, in which the cassette holder comprises peripheral walls about the base and cap members extend inwardly of the cassette holder so as to overlie one or more walls of the cassette holder, spring means are arranged to urge the cap members against the walls of the cassette so as to retain the cassette in place in the cassette holder.

3. A camera as claimed in claim 1, in which there is provided a pair of spaced guide plates arranged to receive the cassette holder.

4. A camera as claimed in claim 3, in which the caps are connected to rods which pass through the guide plates, said rods each having a stop at the end thereof remote from the caps, and a coil spring mounted about the rods between the guide plates and the stops so as to urge the caps towards the cassette holder.

5. A camera for producing microfiche images containing a valve member comprising a stepper motor, a ported housing, a coupling connecting the stepper motor with the interior of the housing, the housing having at least one first inlet port and a corresponding single first outlet port, a group of three second outlet ports and a corresponding single second inlet port, wherein the first outlet port is conenected to a vacuum side of an air pump, a first inlet port is connected to a vacuum platen for holding film sheets, the second inlet port is connected to the air supply side of an air pump, two of the second outlet ports are connected to respective pneumatic cylinders associated with a cassette holder and arranged to raise same for removal or receipt of a film sheet, whilst the remaining second outlet port leads to the atmosphere, means being provided in the housing for selectively interconnecting the inlet ports with their corresponding outlet ports.

6. A camera according to claim 5, in which another first inlet port is connected to a transfer turret arranged to receive a film sheet already containing an image from the vacuum platen so that the image can be reproduced to an enlarged scale.

7. A camera according to claim 6 in which the housing contains rotatable first and second valve members each associated with respective first and second inlet and outlet ports, said rotatable members being coupled together and being arranged to be rotated together by the stepper motor by means of the coupling.

* * * * *